Patented Apr. 13, 1926.                                             1,580,200

UNITED STATES PATENT OFFICE.

HENRY HOWARD, OF CLEVELAND, OHIO, ASSIGNOR TO THE GRASSELLI CHEMICAL COMPANY, OF CLEVELAND, OHIO, A CORPORATION OF OHIO.

BROWN-COLORED INSECTICIDE FOR USE ON TOBACCO PLANTS.

No Drawing.            Application filed May 15, 1922.   Serial No. 561,012.

*To all whom it may concern:*

Be it known that I, HENRY HOWARD, a citizen of the United States, residing at Cleveland, in the county of Cuyahoga and State of Ohio, have invented certain new and useful Improvements in Brown-Colored Insecticide for Use on Tobacco Plants, of which the following is a specification.

This invention relates to colored insecticides suitable for use on certain plants and more particularly to a brown colored insecticide for use on tobacco plants.

Considerable difficulty has been experienced in the use of insecticides due to undesirable coloration or discoloration of the plant products by the insecticide. For instance, when the usual white arsenate of lead is used on tobacco plants it produces on the dried and cured leaves an appearance of mould which reduces the selling price of the tobacco. There is therefore a demand for an insecticide which will not produce undesirable coloration of the plant products.

Efforts have been made to color insecticides such as the white arsenate of lead. It is found however that organic dyes are not sufficiently permanent and that the use of colored pigments is not satisfactory because a comparatively large quantity is required to be mixed with the insecticide and the arsenic content of the product is too low.

This invention is directed to the production of an insecticide which itself possesses the desired color and more specifically to the production of an insecticide containing trimanganoarsenate for use on tobacco plants.

An economical method for the production of such an insecticide in finely divided form and capable of suspension in water is as follows:

Three molecular equivalents of manganese carbonate are stirred into water heated to from 80° to 90° C., and two molecular equivalents of a solution of arsenic acid is added. An energetic reaction takes place with the formation of a jelly like precipitate of a white to light pink color. In order to obtain as complete precipitation as is possible the amount of water employed in the reaction mixture is restricted to a quantity just sufficient to permit free stirring or agitation. The precipitate is then separated from the reaction mixture by draining or filtering. The separated precipitate is a gelatinous mass containing the acid salt of manganese with arsenic acid and one equivalent of unchanged manganese carbonate. This material may be converted to the neutral salt, trimanganoarsenate by boiling with water but I prefer to form the neutral salt by dry heating.

The bulky material is first dried in a steam dryer and is then heated in a muffle furnace for from two to three hours at from 500° to 600° C. It is then pulverized, preferably in a ball mill, and if a product of less density is desired the pulverized material may be subjected to areation to separate the light from the heavy particles.

The product formed as described contains 48 percent or more of $As_2O_5$. It is brown in color suspensible in water and insoluble. It may be employed as an insecticide either in the dry form or in the form of a spray when suspended in water. In order to improve its suspensible properties a small amount (about 1 percent) of goulac or other suitable suspension promoting agent may be added. On account of its relatively high arsenic content it may be mixed with a brown colored pigment such as umber in proportion up to one part of American burnt umber to two parts of the arsenate.

In this way the color of the product may be modified, the price per pound reduced, and a product of substantially the same arsenic content as commercial lead arsenate, that is, about 34 percent $As_2O_5$, produced.

The reactions involved in the preparation of trimanganoarsenate are understood to be as follows:

(1) 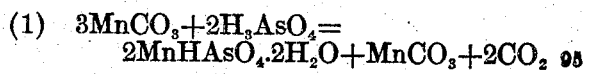
$$3MnCO_3 + 2H_3AsO_4 = 2MnHAsO_4 \cdot 2H_2O + MnCO_3 + 2CO_2$$

(2) 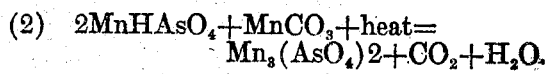
$$2MnHAsO_4 + MnCO_3 + heat = Mn_3(AsO_4)_2 + CO_2 + H_2O.$$

The manganese carbonate employed in the process is conveniently prepared by precipitation from a solution of a soluble manganese salt such as the sulfate or chlorid by means of soda ash (sodium carbonate). The precipitate is filtered and washed and the wet cake is stirred into water as described above.

I claim:

1. A brown colored insecticide in finely divided form capable of suspension in water comprising trimanganoarsenate.

2. A brown colored insecticide in finely divided form capable of suspension in water comprising a neutral insoluble manganese arsenate.

3. An insecticide comprising a brown colored product containing an arsenate of manganese and a brown colored inert material.

4. An insecticide comprising a finely divided mixture of trimanganoarsenate and umber.

5. An insecticide comprising a mixture of trimanganoarsenate and a brown colored inert material, said mixture containing not less than 34 percent of $As_2O_5$.

6. An insecticide comprising about two parts of a brown colored product containing an arsenate of manganese and having an arsenic content of not less than 48 percent of $As_2O_5$, and about one part of burnt umber.

7. Process of making a brown colored insecticide which comprises reacting upon manganese carbonate with arsenic acid, pulverizing the resulting material and mixing the pulverized product with burnt umber.

8. An insecticide comprising trimanganoarsenate.

In testimony whereof, I affix my signature.

HENRY HOWARD.